United States Patent [19]
Rodek

[11] 3,768,904
[45] Oct. 30, 1973

[54] PRINTING APPARATUS INCLUDING REGISTRATION CONTROL

[75] Inventor: Victor Rodek, Rochester, N.Y.

[73] Assignee: Xerox Corporation, Stamford, Conn.

[22] Filed: May 17, 1972

[21] Appl. No.: 254,131

[52] U.S. Cl. .......... 355/40, 226/29, 226/38, 226/42, 355/14, 355/42

[51] Int. Cl. .......... G03b 27/52

[58] Field of Search .......... 355/40, 42, 43, 90, 355/110, 111, 6, 14; 226/2, 27, 28, 29, 30, 38, 40, 42; 101/235; 197/20, 133 A

[56] References Cited

UNITED STATES PATENTS

| | | | |
|---|---|---|---|
| 3,472,136 | 10/1969 | Hemphill | 355/40 X |
| 3,552,308 | 1/1971 | Minehart | 226/42 X |
| 3,576,367 | 4/1971 | Sable | 355/40 X |
| 3,648,911 | 3/1972 | Pekrul | 226/30 |

*Primary Examiner*—Richard M. Sheer
*Attorney*—James J. Ralabate et al.

[57] ABSTRACT

Apparatus for printing prerecorded information provided on a filmstrip. The prerecorded information is printed on a web in registration with pre-printed information thereon. The filmstrip is driven at a controllable velocity, whereas the web is driven at a constant velocity. Sensing mechanisms are provided to sense the respective web and filmstrip velocities and to generate signals indicative thereof. A comparison mechanism is provided to receive the velocity signals and compare the phase relationship therebetween. A delay mechanism is provided to delay for a predetermined interval, the transmission of the signal indicative of the web velocity to the comparison mechanism. A mechanism is coupled to the comparison mechanism for receiving a signal from the comparison mechanism indicative of the phase relationship of the velocity signals and being further operable to vary the velocity of the filmstrip so that a predetermined phase relationship is established for the signals. A predetermined velocity relationship is thus established between the filmstrip and web.

6 Claims, 4 Drawing Figures

3 Sheets-Sheet 1

PRINTING APPARATUS INCLUDING REGISTRATION CONTROL

BACKGROUND OF THE INVENTION

The present invention relates to apparatus for printing prerecorded information from a filmstrip moving at a controllable velocity onto a web moving at a constant velocity. In particular, this invention relates to apparatus for printing prerecorded information in registration with pre-printed information on the web.

The utilization of micromedia, for example, microfilm, for the storage of large volumes of data has become increasingly popular in recent years. However, the practical use and therefore the growth of such technique has been somewhat handicapped by problems associated with the retrieval and reproduction of the microfilm data in a readily usable manner.

One of the more recent technological innovations has been the utilization of computers to generate the information required to be stored on the microfilm. The computer provides a visual output, for example on the screen of a cathode ray tube, which output is then photographed onto microfilm. Such computer generated information may comprise variable information, such as customer accounts. To achieve full utilization of the information stored on the microfilm, it is desirable to print such variable information onto forms having pre-printed information thereon. The pre-printed forms may comprise a business operation's letterhead, distinctive logo or other similar type of non-varying information. It is obvious that it thence becomes necessary to transfer or print the variable prerecorded information from the microfilm onto the web so that the variable information is registered with appropriate portions of the pre-printed information. A final document is thus produced that may be readily circulated to achieve the desired information dissemination.

The availability of commercial machines for printing the variable information on microfilm in registration with pre-printed information has been extremely limited. In lieu of directly utilizing the microfilmed data, it has been the general practice to employ chain printers of the type well known to those familiar with computer and associated arts and marketed by such companies as IBM. The chain printers are driven by computer generated tape and operate to provide the final documents having the variable data printed in registration with the pre-printed information. However, the inherent speed deficiencies associated with a chain printer due to its line by line, intermittent paper feed, mode of operation has created the need for alternative printing means. However, to effectively compete with chain printers, such alternative means must have the attributes of being extremely reliable and relatively inexpensive to operate.

To obtain the above-mentioned machine specifications and to directly utilize the microfilm having the variable data photographed thereon, it has been proposed that a xerographic copying machine be employed. The microfilm having the variable data would function as the original document for copying purposes. A copy medium, preferably a web of paper, would have the pre-printed non-variable information provided thereon.

To achieve the desired registration between the variable data and the non-variable data, it is thus necessary to synchronize the movement of the film relative to the copy medium so that the desired registration is obtained.

A synchronizing apparatus that has proven highly satisfactory in achieving the desired registration is disclosed in copending application, Ser. No. 89,869, filed Nov. 16, 1970, now U.S. Pat. No. 3,684,158 in the name of James M. Donohue, Joseph R. Creamer, and Victor Rodek, inventors. The invention disclosed in the copending application obtains the desired synchronization by monitoring the speed of the filmstrip and the copy receiving medium and varying the velocity of the filmstrip to achieve a predetermined relationship with the velocity of the copy medium which is maintained constant. Registration marks are provided on the filmstrip and on the copy medium. Sensing mechanisms are provided to sense the passage of the registration marks through a sensing station and to generate control signals upon such occurrance. Such control signals are indicative of the respective velocities of the film and copy medium. Comparison means are provided to receive the signals and compare the phase relationship therebetween. Appropriate means are coupled to the comparison means for receiving a signal from the comparison means indicative of the phase relationship of the signals generated in response to the passage of the registration marks. The last mentioned means is further operable to vary the velocity of the filmstrip so that a predetermined phase relationship is established for the registration signals. A predetermined velocity relationship is thus established between the filmstrip and copy medium. So long as the registration marks on the paper and on the filmstrip are located in non-varying positions, the synchronizing apparatus of the copending application achieves accurate registration. However, registration marks, particularly on the microfilm, do not always fall in the same relative location from one roll of microfilm to the next. Thus, if the registration marks sensing devices are installed at a fixed location, any variation in the location of the registration marks, either on the film or on the copy medium, or on both, from the locations which determined the fixed position of the sensing devices, will result in registration being unobtainable.

In order to achieve registration for all combinations of the locations of the registration marks on the film and on the paper, the sensing devices would have to be relocated for every change in microfilm roll. As is obvious, this would be time consuming. In addition, any failure to achieve extreme accuracy in the relocation of the sensing devices would result in unregistered variable information on the pre-printed forms. This would be highly unacceptable to the user of the machine.

SUMMARY OF THE INVENTION

It is therefore an object of the present invention to provide apparatus for registering variable information contained on microfilm onto pre-printed information contained on a copy medium.

It is yet another object of this invention to provide an improved apparatus for registering predetermined portions of a first high speed continuously moving web, movable at a controllable velocity, with predetermined portions of a second high speed continuously moving web movable at a constant velocity.

It is a further object of the present invention to provide an apparatus having the capability of printing variable data from microfilm strip onto pre-printed forms with precise registration of the variable data with the pre-printed information, regardless of any variations in the location of registration marks on the film from one roll to the next.

Other objects and advantages of the present invention will be apparent from the detailed description of the exemplary embodiment.

In accordance with the invention, a first web is provided having prerecorded information thereon. Driving means are coupled to the web to continuously drive the web at a controllable velocity. A second movable web is provided having pre-printed information thereon. Second driving means are coupled to the second web to continuously drive the web at a constant velocity. Sensing mechanisms are provided to sense the respective web and filmstrip velocities and to generate signals indicative thereof. Comparison means are provided to receive the signals and compare the phase relationship therebetween. A delay mechanism is provided to delay for a predetermined interval, the transmission of the signal indicative of the web velocity to the comparison means. Means are coupled to the comparison means for receiving a signal from the comparison means indicative of the phase relationship of the velocity signals and being further operable to vary the velocity of the filmstrip so that a predetermined phase relationship is established for the velocity signals. A predetermined velocity relationship is thus established between the filmstrip and the web.

DESCRIPTION OF THE PREFERRED EMBODIMENT

Figure 1:
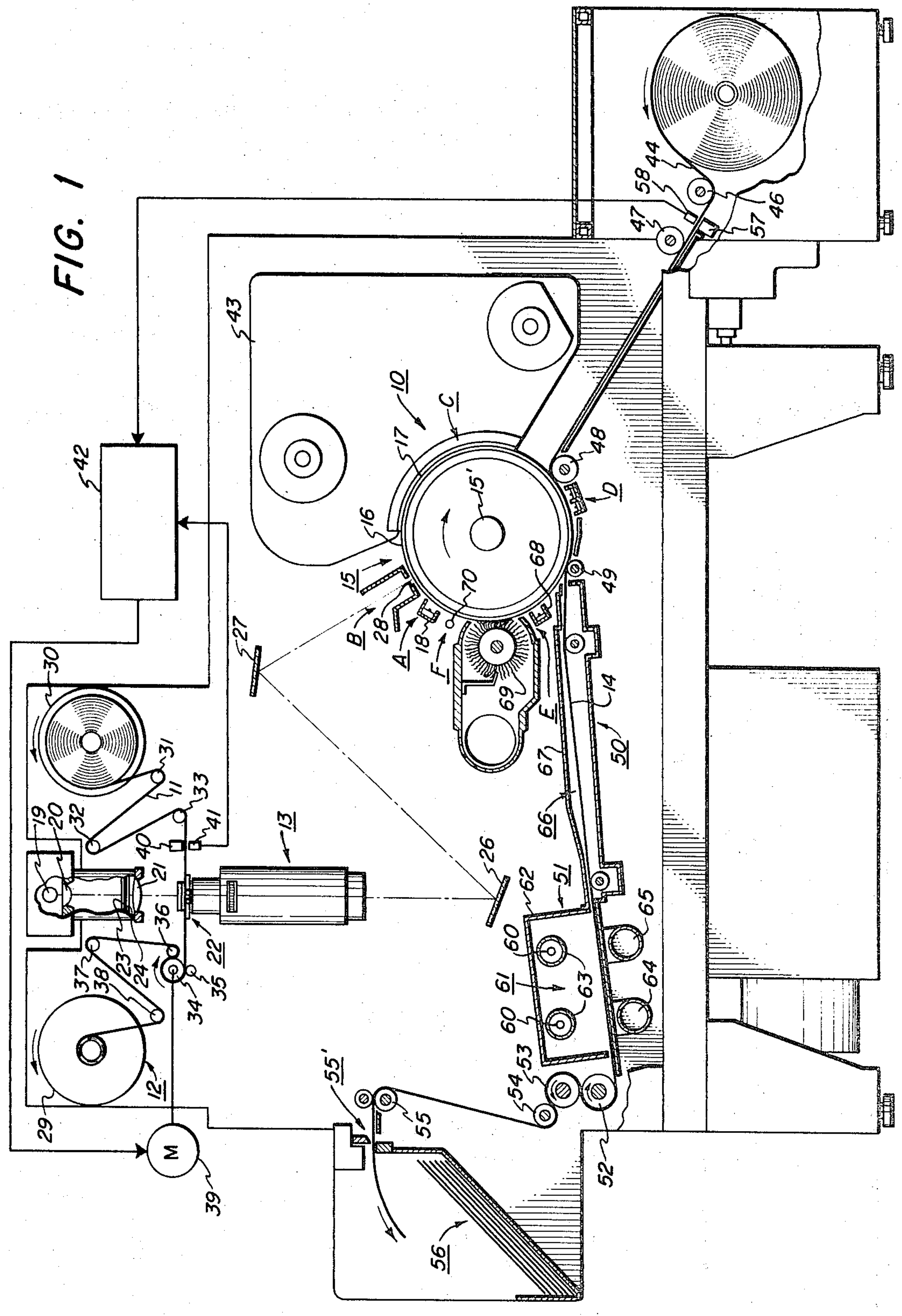
FIG. 1 is a schematic sectional illustration of a machine in which the present invention is embodied.

Referring now to the drawings, FIG. 1 shows a system for reproducing information wherein the apparatus of the present invention may be employed. The system includes a xerographic machine 10, a filmstrip 11, a film transport 12, optical projecting means 13 and copy receiving medium 14.

Xerographic machine 10 includes a photosensitive member 15 which is driven about a shaft 15′ by a motor not shown. Member 15 comprises a photoconductive insulating material 16, such as vitreous selenium overlaying an electrically conductive backing 17. The photoconductive insulating material is adapted, in the well-known manner, to have an electrostatic charge applied to its surface and to selectively dissipate such electrostatic charge upon the exposure thereof to illumination corresponding to a light and dark pattern, such as an information pattern, whereupon an electrostatic latent image is formed on member 15. Although photosensitive member 15 is illustrated in a configuration of a drum, the member may take any convenient form such as an endless belt. The electrostatic charge is applied to the surface of member 15 by passing it under charging station A. The charging station includes any suitable means for placing a uniform electrostatic charge on the insulation material, such as a corona charging device 18.

As noted before, an electrostatic latent image of an original subject to be reproduced is formed via the selective dissipation of the charge on the surface of member 15. The selective charge dissipation is accomplished at exposing station B.

Exposing station B includes a source of light 19 capable of emitting light of the desired intensity, condenser lenses 20 and 21 which serve to conduct the light to an area of concentration disposed in the vicinity of film gate 22 and spectral and heat filters 23 and 24 which serve to filter the light passing to gate 22 so it has desired spectral and heat characteristics.

The images provided by the illumination of the original document at film gate 22 are projected, via optical projecting means 13, object mirror 26 and image mirror 27, to an exposure slit 28 at station B. Mirrors 26 and 27 are fixed in place at predetermined locations.

Optical projecting means 13 comprises at least one magnifying lens adapted to project images at a desired magnification ratio. As illustrated, optical projecting means comprises a zoom lens which provides infinite magnification ratios within a predetermined range.

The original document is preferably a filmstrip 11 comprising a web of microfilm, bearing images of information prerecorded thereon, and uniformly spaced sense markings distributed along the length thereof. The spaced sense markings are provided for a reason to be more fully explained hereinafter. Either negative or positive microfilm may be employed as the filmstrip.

The term "positive microfilm" refers to microfilm having opaque information images appearing on a transparent background. When positive microfilm is illuminated, and the image is projected onto the surface of member 15, the charge thereon is dissipated in areas equivalent to the transparent non-information bearing portions of the microfilm. The charge remaining on the surface of member 15 is equivalent to the opaque, information portions of the microfilm.

If negative microfilm is employed, the reverse operation occurs. As used herein, the term "negative microfilm" refers to microfilm having transparent information areas appearing on an opaque background. When negative microfilm is illuminated and the image is projected onto the surface of member 15, the charge thereon is dissipated in areas equivalent to the transparent information portions on the microfilm. The charge remaining on the surface of member 15 is equivalent to the opaque non-information portions of the microfilm.

Filmstrip 11 is adapted to be transported from supply reel 30, over guide rolls 31, 32 and 33, normal to film gate 22, over capstan 34, guide rolls 35, 36, 37 and 38 and on to take-up reel 29. Guide rolls 35 and 36 are provided to firmly wrap the filmstrip about capstan 34. Capstan 34 is mechanically coupled to electric motor 39. A separate motor (not shown) is employed to drive reel 29. A lamp 40 or other source of light is fixedly disposed relative to filmstrip 11 and is in optical communication with a photocell means 41. Photocell means 41 and lamp 40 combine to sense the passage of the spaced sense markings on the filmstrip and to generate a signal in response thereto. The signal is transmitted to a synchronizing apparatus 42 to be more fully explained hereinafter.

Xerographic machine 10 further includes a developing station C. Developing station C includes developing means 43 whcih may comprise any well-known form of electrophotographic developing apparatus which acts to develop an electrostatic latent image by the application of developer material. The developer material comprises carrier granules and toner particles. The toner particles adhere to the latent image on the surface of member 15 thereby developing the image. The developing means 43 illustrated in FIG. 1 is of the cascade type. Cascade development is well-known in the electrophotographic arts and no further elaboration thereon is deemed necessary.

Following image development, the next step in the typical xerographic process is the transfer step which is accomplished at transfer station D. The image is transferred from photosensitive member 15 to the copy receiving medium 14 which is preferably a web of paper 44. Web 44 is adapted to be transported from supply roll 45 over guide rolls 46, 47 and 48, through transfer station D, over guide roll 49 and through attenuator 50 and fusing means 51. The paper thence passes into the nip of drive rollers 52 and 53 and passes over guides 54 and 55 and is thence cut to predetermined lengths via guillotine blade 55'. The final documents are then stacked in stacker 56.

Fuser 51 provided for fixing the toner to the paper web is of the type known to those skilled in the art as a "flash fuser." Flash fuser 51 comprises a plurality of elongated generally tubular sources of radiant energy 60 supported within a generally rectangular cavity 61 defined by frame member 62. The sources of radiant energy are capable of emitting energy wavelengths at which the web is essentially non-absorbent and at which the toner particles forming the image are highly absorbent. A xenon arc lamp may be employed as the source of radiant energy.

A glass tube 63 encapsulates each of the energy sources 60. A blower means (not shown) provides a continuous supply of cool air, via ducts 64 and 65 between the inner surface of glass tubes 63 and the outer surface of the sources of radient energy. The cool air is supplied to prevent the xenon lamps from becoming overheated during their prolonged use.

As is illustrated, the web of paper is moved through the cavity transversely to the axes of energy sources 60. The sources 60 are pulsed for a predetermined period of time at predetermined intervals. The toner particles adhering to the web absorb the radiant energy thus produced and are thereby affixed to the web. It should be understood that other forms of fixing devices, such as heat fixing, or combinations of heat and pressure fixing devices, may be employed in lieu of the illustrated flash fuser. Such alternative fusing devices are well known to those skilled in the art. If a more detailed description of a flash fusing device is desired, reference may be had to U.S. Pat. No. 3,529,129.

An attenuator 50 is disposed between fuser 51 and photoconductive member 15. The web of paper passes through a cavity 66 defined by the frame member 67 of the attenuator. Attenuator 50 is provided to prevent the transmission of any radiant energy from fuser 51 to the surface of photoconductive member 15.

For a more detailed explanation of attenuator 50, reference may be had to copending patent application, Ser. No. 250,636, filing date May 5, 1972 and filed in the name of Adelbert Lux.

Lamp means 57 is fixedly disposed along the path of travel of web 44. The lamp is in optical communication with a photocell 58. Lamp 57 and photocell 58 cooperate to generate a signal upon the passage of uniformly spaced sense markings which are provided along the length of web 44. The signal thus generated by the passage of the markings is indicative of the velocity of the web. The velocity signals are transmitted to synchronizer apparatus 42.

In addition to the sense markings, the web has preprinted information thereon. Such information may include appropriate headings, columns and the like, wherein it is desired to print the variable information recorded on filmstrip 11 in registration with appropriate portions of the pre-printed information on the web.

To complete the xerographic process, the photoconductive member moves through a cleaning station E and an erase station F before completing the cycle.

Cleaning station E includes a pre-clean corotron 68 which provides a charge, to neutralize the charge holding any untransferred toner onto the surface of member 15.

After passing under the pre-clean corotron, the surface of member 15 is then brushed by rapidly rotating brush 69 to remove any remaining toner from the surface of the photoconductive member.

Subsequent to the brushing step, the member passes under a source of light 70 which provides light energy to effectively dissipate any remaining charge on the photoconductive member's surface. The member is then ready to start a new cycle by being exposed to the charging corotron 18. Any of the known equivalents of process or apparatus elements may be employed in connection with the present invention without departing from the spirit thereof.

Figure 2:
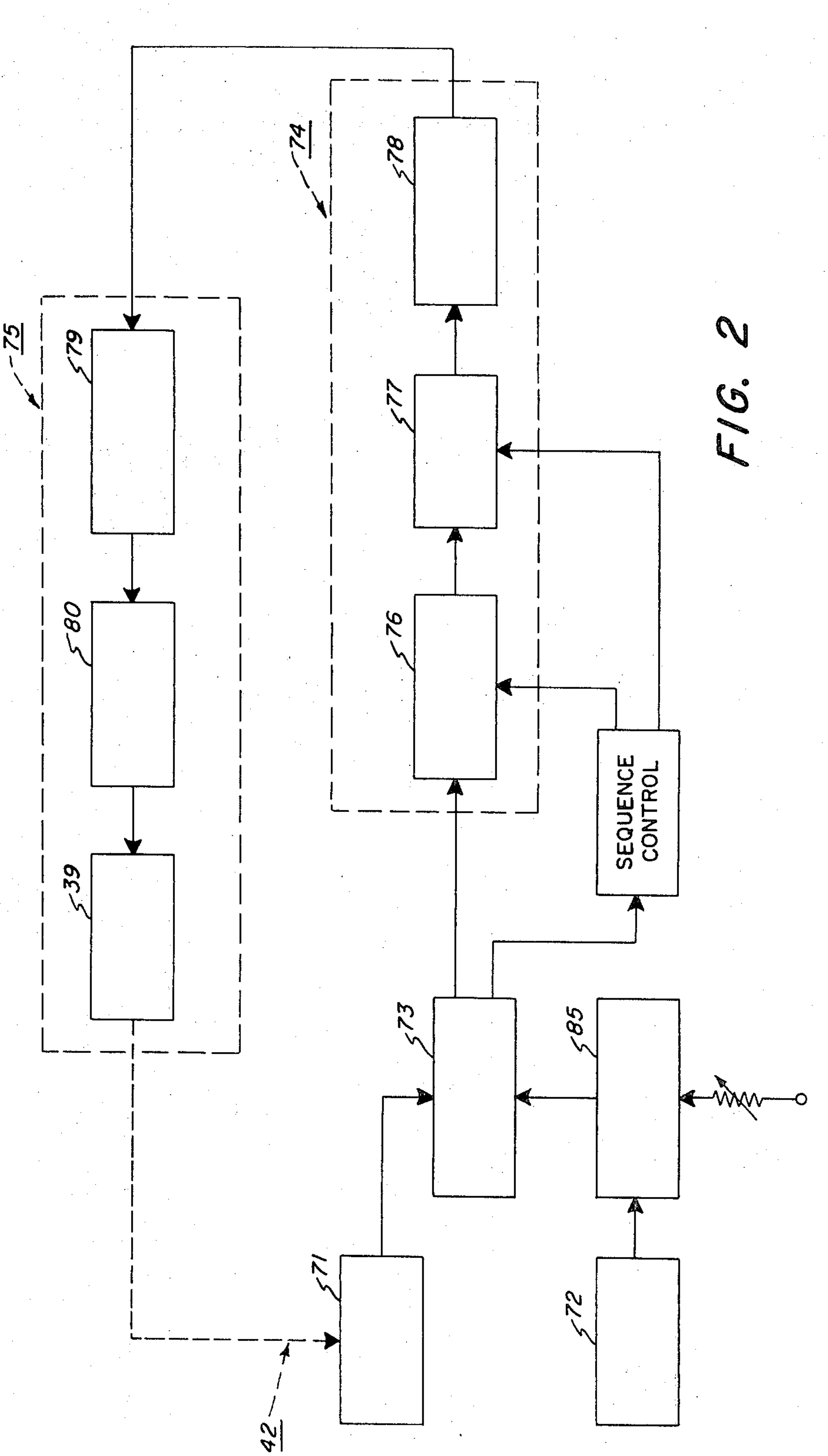
FIG. 2 is a block diagram of a synchronizing apparatus including the invention herein disclosed.

Now referring to FIG. 2, there is illustrated a block diagram of an embodiment of synchronizing apparatus 42. As discussed hereinbefore, the speed of filmstrip 11 is controllable, whereas the speed of web 44 is maintained constant. Thus, the synchronizer functions to vary the speed of the filmstrip so that the variable information provided on the filmstrip is printed in registration with appropriate portions of the pre-printed information on the web.

The synchronizing apparatus comprises first signal producing means 71, second signal producing means 72, comparison means 73, control signal generating means 74 and feedback means 75.

First signal producing means 71 includes light source 40 and photocell 41 responsive thereto, which, as previously noted, are disposed along the path of movement of filmstrip 11. The photocell and light source cooperate to provide a pulse signal upon the passage of the sense markings that are spaced uniformly along the length of the filmstrip.

Second signal producing means 72 comprises light source 57 and photocell 58 responsive thereto. The foregoing components of signal producing means 72 cooperate to provide a pulse signal upon the passage of the sense markings that are spaced uniformly along the length of the web. As noted previously, the photocell and light source are disposed at predetermined locations along the path of movement of the web. Upon the passage of the sense markings, the light source and photocell cooperate to provide a pulse signal indicative of web velocity. However, since the web is moving at a constant velocity, a suitable reference signal may be generated from some other source.

Comparison means 73 is coupled to the first and second signal producing means and is operable to determine the phase relationship between each of the signals supplied thereto. Comparison means 73 generates a reference signal indicative of the sensed phase relationship. Preferably, comparison means 73 comprises a pulse generating means having a time duration proportional to the difference different of the signals supplied thereto.

Delay means 85 is positioned in the path of flow of the signal transmitted from second signal producing means 72 to comparison means 73. Delay means 85 is provided to controllably delay the transmission of such signal for a predetermined variable period of time for a reason that shall be more fully explained hereinafter.

Control signal generating means 74 receives the signal transmitted from comparison means 73 and generates a signal having a magnitude proportional to the duration of the pulse generated by comparison means 73. Generating means 74, as illustrated in FIG. 2, includes integrating means 76 coupled to storage means 77 which in turn is coupled to a control voltage generator 78.

The output of control signal generating means 74 is coupled to feedback means 75. Feedback means 75 is operable to modify the operation of first signal producing means 71 in accordance with the control signal transmitted from generating means 74.

In the preferred embodiment illustrated in FIG. 2, feedback means 75 comprises variable frequency generating means 79 having an output coupled to motor 39 which drives capstan 34. Variable frequency generating means 79 is supplied with the control signal transmitted from generating means 74. Variable frequency generating means 79 thence provides a signal having a frequency determined by the magnitude of the control signal transmitted thereto. An amplifier 80 is preferably connected between generating means 79 and motor 39 to amplify the output signal provided by the generating means. The speed of motor 39 is varied to control the speed of filmstrip 11 so that a desired velocity relationship is established between the filmstrip and web. Photocell 41 and lamp 40 cooperate to sense the altered speed of filmstrip 11 and to generate a new signal indicative of the varied speed. When a desired phase relationship is established between the signals generated by means 71 and 72, comparison means 73 is rendered inoperative; that is, the comparison means does not, under such operating conditions, provide a signal to control signal generating means 74.

The foregoing description of the representative synchronizing apparatus illustrated in FIG. 2, is only intended as a brief summary thereof. If a more detailed explanation is desired, reference may be had to the aforecited copending application, Ser. No. 89,869, filed Nov. 16, 1970. It should be understood that various modifications may be made in the representative synchronizing apparatus without departing from the spirit of the invention.

The aforedescribed synchronizer effectively regulates the speed of the filmstrip relative to the speed of the web so the variable information is printed in registration with appropriate portion of the pre-printed information on the web.

It has been determined that in view of the numerous sources from which a filmstrip roll may be obtained, the location of the spaced sense markings relative to individual frames of information will vary from roll to roll. That is, a spaced sense marking may be at one location relative to a fixed reference point, for example, the leading edge of an information frame, on one roll, and be at a second location relative to the same reference point on a second roll. The synchronizing apparatus would, regardless of the position of the spaced sense markings relative to a fixed reference point, attempt to synchronize the speed of the filmstrip with the speed of the web. The synchronizer would operate to vary the speed of the filmstrip so that the phase relationship of the spaced sense markings would be indicative of synchronization. However, although synchronization therebetween is obtained, the desired registration between the variable data and the pre-printed information would not be achieved when the spaced sense markings are positioned at a different location relative to a given reference. To compensate for the variations in the position of the spaced sense markings relative to a given reference point from one roll to another, an operator of the machine might vary the position of the light source 40 and photocell 41 responsive thereto. The distance the aforenoted components would be moved relative to their initial location would be determined by the variation in position of the spaced sense markings relative to a reference point on the filmstrip.

Thus, initially the light source and photocell would be positioned, on the machine so that when the desired phase relationship is obtained for the signals generated by first signal producing means 71 and second signal producing means 72, registration of the variable data with the pre-printed information would be accomplished. If the position of the spaced sense markings on the filmstrip were to vary from the initial roll to the next, the operator would have to move the photocell and light source an appropriate distance, for example closer to the film gate if the markings were closer to the reference point and further from the film gate, if the markings were further from the reference point to accommodate for the changed location of the spaced sense markings. Thus, when synchronization of the speed of the filmstrip with the speed of the web is accomplished registration would also be obtained.

As is obvious, such an operator adjustment would be considerably time consuming and therefore undesirable. In addition, it would be necessary to precisely reposition the photocell and light source in proportion to the change in location of the spaced sense markings in order to achieve registration. Such precise repositioning may be quite difficult to obtain without the addition of complex mechanisms, which would considerably increase the cost of the machine. As noted hereinbefore, it is therefore one of the objects of this invention to expeditiously achieve registration of the pre-printed information with the variable data regardless of any change in the location of the spaced sense markings from one roll to another.

It has been determined that, although the exact location of the spaced sense markings on the filmstrip may vary, they will almost always appear at or after the centerline of the information frame associated therewith. Thus, if the position of the spaced sense markings on the web is maintained at a specified fixed location, such that the signal generated in response to the passage of such markings will always be generated earlier than the signal generated in response to the passage of the markings on the filmstrip, an operator may readily compensate for the change in location of the spaced sense markings on the filmstrip. The transmission of the signal indicative of the web velocity is delayed for varying intervals of time. As noted previously, since web velocity is maintained constant, the signal indicative of the velocity thereof may be a fixed reference signal supplied at a predetermined time interval. However, whether such signal is generated by the passage of spaced sense markings on the web, or is in the alternative a fixed reference signal, such signal will always be generated earlier than the signal indicative of the velocity of the filmstrip. The transmission of the web signal or fixed reference signal to comparison means 73 will be delayed for controllable periods of time to thereby compensate for the change in location of the markings on the filmstrip.

Figure 3:
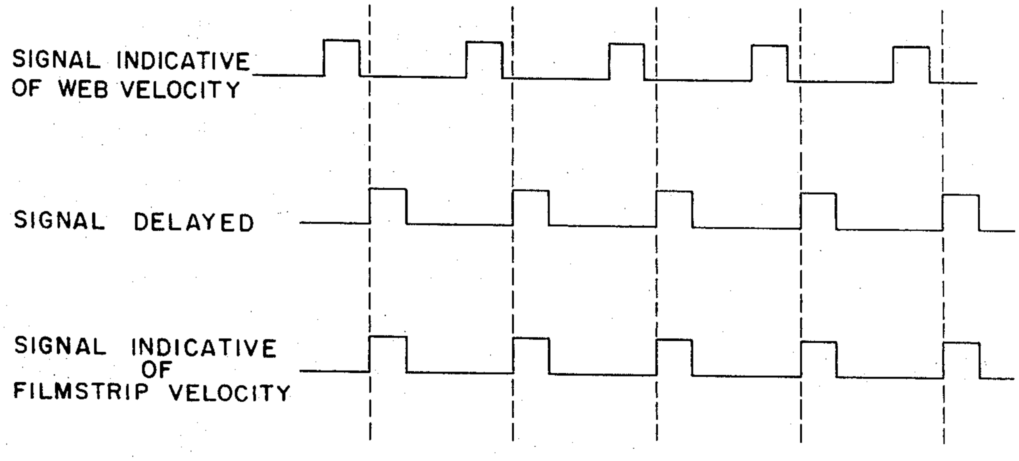
FIG. 3 illustrates representations of control signals generated by the synchronizing apparatus disclosed in FIG. 2.

With reference to FIG. 3, the signal appearing at the top of the figure is the generated signal indicative of the web velocity. The middle signal represents the same web velocity or fixed reference signal after it has been delayed for the desired time period. The lower signal of FIG. 3 illustrates the generated signal indicative of filmstrip velocity. The phase relationship of the delayed signal and the filmstrip signal indicates that synchronization of the speed between the web and filmstrip has been obtained and registration of the pre-printed information and variable data will be achieved.

Figure 4:
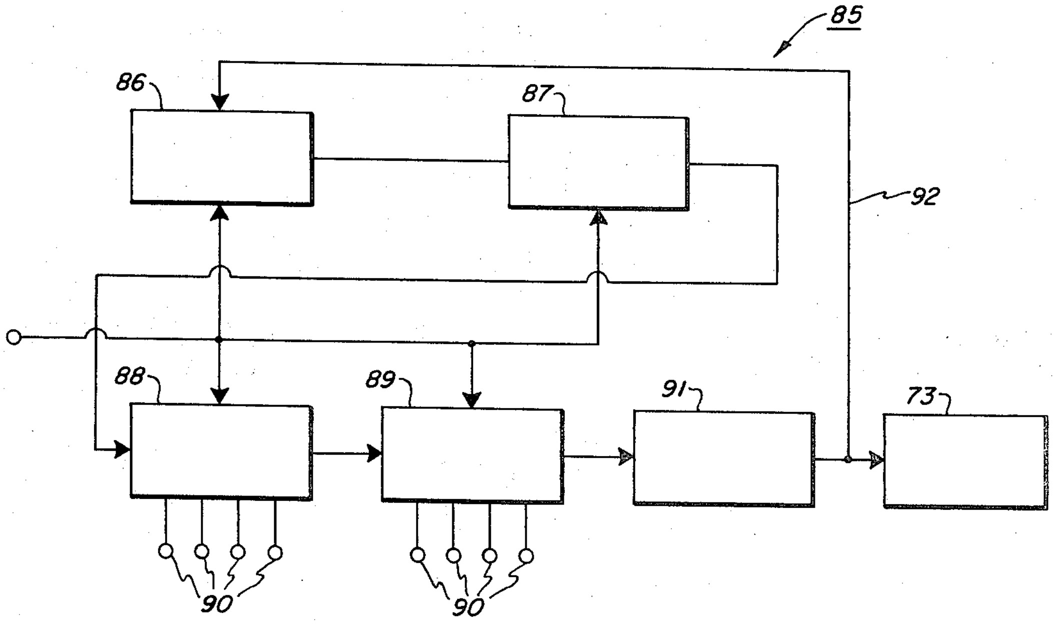
FIG. 4 illustrates a preferred embodiment of the present invention.

FIG. 4 illustrates schematically components which may comprise delay means 85. The illustrated delay means 85 to be described is digital, but any variety of analog means may be satisfactorily employed to achieve the objectives of the invention. Master clock 86 is provided to supply a pulse at a predetermined frequency, for example 12,000 pulses per second. A divider 87 receives the signal pulses and transmists the signal at a reduced frequency. For example, divider 87 may transmit the 12,000 pulses per second signal supplied thereto at a rate of 160 pulses per second. The signal transmitted from divider 87 is supplied to series connected binary coded decimal dividers 88 and 89, hereinafter BCD. The BCDs have a plurality of inputs 90 connected thereto. The inputs are selectively operatively connected to each of the BCDs to provide the desired delay interval. The signal provided from the BCDs is thence transmitted to a monostable or single shot device 91 which is adapted to transmit the signal to comparison means 73 at the appropriate time. Additionally, the output from device 91 is transmitted to master clock 86 via line 92. The signal from device 91 operates to stop clock 86 from coninuing to supply a pulse output once a signal is transmitted via device 91. The signal produced by the passage of the spaced sense markings on the filmstrip through the sensing station is employed to enable clock 86 to provide its pulse signal.

After the output signal from monostable device 91 has been supplied to comparison means 73 for a predetermined time interval, the signal is terminated. Reference signals are then supplied to clock 86, divider 87 and BCDs 88 and 89 to reset the devices to their initial state. The termination of the output signal from device 91 returns that device to its initial or stable state.

As noted before, the delay interval for the transmission of the signal through device 91 to comparison means 73 is determined by the variation in location of the spaced sense markings from a fixed reference point, as for example, the leading edge of the information frame or the centerline of such frame. Once the permanent positions of the photocell and lamp source are determined, the delay interval for any given roll of film may be readily computed. The operator is then appraised of such delay interval and sets the BCDs to appropriate settings. Thus, when synchronizing apparatus 42 regulates the speed of the filmstrip to obtain the desired phase relationship between the signals indicative of the respective velocities of the filmstrip and the web, registration of the variable data with the pre-printed information will be obtained. As is readily apparent, the desired registration may be obtained without requiring the operator to perform time consuming precision readjustments of the locations of the photocell and light source.

While a preferred embodiment of the invention has been described and illustrated, the invention is not limited thereto but may be otherwise embodied within the scope of the appended claims.

What is claimed is:

1. Apparatus for printing prerecorded information in registration with pre-printed information comprising:

means bearing such prerecorded information distributed along the length thereof, a movable web bearing such pre-printed information along the length thereof, first driving means coupled to said web to drive said web at a constant velocity, second driving means coupled to said prerecorded information bearing means for driving said means at a controllable velocity, means to sense the velocity of said web and to generate a first signal indicative thereof, means to sense the velocity of said prerecorded information bearing means and to generate a second signal indicative thereof, means for receiving said first and second signals and being responsive thereto for adjusting the operation of said second driving means to obtain a desired velocity for said prerecorded information being means, said desired velocity being directly related to the velocity of the web, means for delaying the transmission of, for a predetermined period of time, a selected one of said signals from the respective one of said velocity sensing means to said signal receiving means, and means for printing the prerecorded information on said movable web in registration with such preprinted information.

2. The apparatus as defined in claim 1 wherein said delay means comprises:

clock means operable in response to said selected one of said signals for providing pulses at a predetermined frequency, means operatively connected to said clock means for producing pulses at a selected frequency, said selected frequency being less than said predetermined frequency, said producing means being adjustable such that said selected frequency corresponds to a signal which is delayed a predetermined time period relative to said selected one of said signals, and means for coupling said delayed signal to said signal receiving means.

3. The apparatus as defined in claim 2 wherein said coupling means applies said delayed signal to said clock means whereby said clock means is inhibited from providing pulses.

4. Apparatus for printing prerecorded information in registration with pre-printed information comprising:

a filmstrip bearing such prerecorded information and first uniformly spaced sense markings distributed along the length thereof, a web bearing such pre-printed information and second uniformly spaced sense markings distributed along the length thereof, first driving means coupled to said filmstrip to drive said filmstrp at a controllable velocity, second driving means coupled to said web to drive said web at a constant velocity, first detecting means fixedly disposed relative to said filmstrip for detecting the passage of each of said first uniformly spaced sense markings through a first predetermined position and for generating a first signal in response to each detected sense marking whereby the frequency of said generated signal is representative of the velocity of said filmstrip, second detecting means fixedly disposed relative to said web for detecting the passage of each of said second uniformly spaced markings through a second predetermined position and for generating a second signal in response to each detected sense marking whereby the frequency of said generated signal is representative of the velocity of said web, comparison means for receiving said first and second signals and for determining the phase relationship therebetween, delay means for delaying, for a predetermined period of time, the transmission of said second signal from said second detecting means to said comparison means, means coupled to said comparison means for altering the velocity of said first movable member relative to said second movable member so a predetermined phase relationship is established for said first and second signals whereby the velocity of the filmstrip is regulated to obtain a desired relationship to the velocity of the web, and means for printing such prerecorded information from the filmstrip onto the web in registration with the pre-printed information thereon once the desired velocity relationship between the filmstrip and web has been obtained.

5. The apparatus as defined in claim 4 wherein said delay means comprises:

clock means operable in response to the signal generated by said second detecting means for providing pulses at a predetermined frequency, means operatively connected to said clock means for producing pulses at a selected frequency, said selected frequency being less than said predetermined frequency, said producing means being adjustable such that said selected frequency corresponds to a signal which is delayed a predetermined time period relative to the signal generated by said second detecting means, and means for coupling said delayed signal to said signal receiving means.

6. The apparatus as defined in claim 5 wherein said coupling means applies said delayed signal to said clock means whereby said clock means is inhibited from providing pulses.

* * * * *

UNITED STATES PATENT OFFICE

CERTIFICATE OF CORRECTION

Patent No. 3,768,904 Dated October 30, 1973

Inventor(s) Victor Rodek

It is certified that error appears in the above-identified patent and that said Letters Patent are hereby corrected as shown below:

In column 2, line 6, delete "now U.S. Pat. No. 3,684,158".

Signed and sealed this 8th day of October 1974.

(SEAL)
Attest:

McCOY M. GIBSON JR.
Attesting Officer

C. MARSHALL DANN
Commissioner of Patents